(12) United States Patent
Hogenauer

(10) Patent No.: US 6,874,079 B2
(45) Date of Patent: Mar. 29, 2005

(54) ADAPTIVE COMPUTING ENGINE WITH DATAFLOW GRAPH BASED SEQUENCING IN RECONFIGURABLE MINI-MATRICES OF COMPOSITE FUNCTIONAL BLOCKS

(75) Inventor: Eugene B. Hogenauer, San Carlos, CA (US)

(73) Assignee: Quicksilver Technology, San Jose, CA (US)

( * ) Notice: Subject to any disclaimer, the term of this patent is extended or adjusted under 35 U.S.C. 154(b) by 493 days.

(21) Appl. No.: 09/916,141

(22) Filed: Jul. 25, 2001

(65) Prior Publication Data

US 2003/0028750 A1 Feb. 6, 2003

(51) Int. Cl.[7] .............................................. G06F 15/80
(52) U.S. Cl. ........................... 712/201; 712/11; 712/15; 712/18; 712/35; 712/221
(58) Field of Search .............................. 712/11, 15, 18, 712/35, 201, 221, 16, 17, 32

(56) References Cited

U.S. PATENT DOCUMENTS

| | | | | |
|---|---|---|---|---|
| 4,748,585 A | * | 5/1988 | Chiarulli et al. ............... | 712/15 |
| 5,794,067 A | * | 8/1998 | Kadowaki ..................... | 712/35 |
| 6,366,999 B1 | * | 4/2002 | Drabenstott et al. .......... | 712/24 |
| 6,510,510 B1 | * | 1/2003 | Garde ........................ | 712/218 |
| 2002/0089348 A1 | * | 7/2002 | Langhammer ............... | 326/38 |

* cited by examiner

Primary Examiner—Kenneth S. Kim
(74) Attorney, Agent, or Firm—Sawyer Law Group LLP

(57) ABSTRACT

Aspects of a method and system for digital signal processing within an adaptive computing engine are described. These aspects include a mini-matrix, the mini-matrix comprising a set of composite blocks, each composite block capable of executing a predetermined set of instructions. A sequencer is included for controlling the set of composite blocks and directing instructions among the set of composite blocks based on a data-flow graph. Further, a data network is included and transmits data to and from the set of composite blocks and to the sequencer, while a status network routes status word data resulting from instruction execution in the set of composite blocks. With the present invention, an effective combination of hardware resources is provided in a manner that provides multi-bit digital signal processing capabilities for an embedded system environment, particularly in an implementation of an adaptive computing engine. These and other advantages will become readily apparent from the following detailed description and accompanying drawings.

24 Claims, 6 Drawing Sheets

ADAPTIVE COMPUTING ENGINE WITH DATAFLOW GRAPH BASED SEQUENCING IN RECONFIGURABLE MINI-MATRICES OF COMPOSITE FUNCTIONAL BLOCKS

FIELD OF THE INVENTION

The present invention relates to digital signal processing, and more particularly to a digital signal processing engine in an embedded system environment.

BACKGROUND OF THE INVENTION

The electronics industry has become increasingly driven to meet the demands of high-volume consumer applications, which comprise a majority of the embedded systems market. Embedded systems face challenges in producing performance with minimal delay, minimal power consumption, and at minimal cost. As the numbers and types of consumer applications where embedded systems are employed increases, these challenges become even more pressing. Examples of consumer applications where embedded systems are employed include handheld devices, such as cell phones, personal digital assistants (PDAs), global positioning system (GPS) receivers, digital cameras, etc. By their nature, these devices are required to be small, low power, lightweight, and feature-rich.

In the challenge of providing feature-rich performance, the ability to produce efficient utilization of the hardware resources available in the devices becomes paramount. Of particular concern is the manner in which hardware resources are utilized to achieve desired digital signal processing functionality. The present invention addresses the need for a digital signal processing engine in an embedded system environment.

SUMMARY OF THE INVENTION

Aspects of a method and system for digital signal processing within an adaptive computing engine are described. These aspects include a mini-matrix, the mini-matrix comprising a set of composite blocks, each composite block capable of executing a predetermined set of instructions. A sequencer is included for controlling the set of composite blocks and directing instructions among the set of composite blocks based on a dataflow graph. Further, a data network is included and transmits data to and from the set of composite blocks and to the sequencer, while a status network routes status word data resulting from instruction execution in the set of composite blocks.

With the present invention, an effective combination of hardware resources is provided in a manner that provides multi-bit digital signal processing capabilities for an embedded system environment, particularly in an implementation of an adaptive computing engine. These and other advantages will become readily apparent from the following detailed description and accompanying drawings.

DETAILED DESCRIPTION OF THE INVENTION

The present invention relates to digital signal processing in an embedded system environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a preferred embodiment, the aspects of the present invention are provided in the context of an embedded system environment employing an adaptive computing engine in accordance with the description in co-pending U.S. patent application Ser. No. 09/815,122, entitled "Adaptive Integrated Circuitry with Heterogeneous and Reconfigurable Matrices of Diverse and Adaptive Computational Units Having Fixed, Application-Specific Computational Elements", assigned to the assignee of the present invention and incorporated by reference in its entirety herein. Portions of that description are reproduced hereinbelow for clarity of presentation of the aspects of the present invention.

Figure 1:
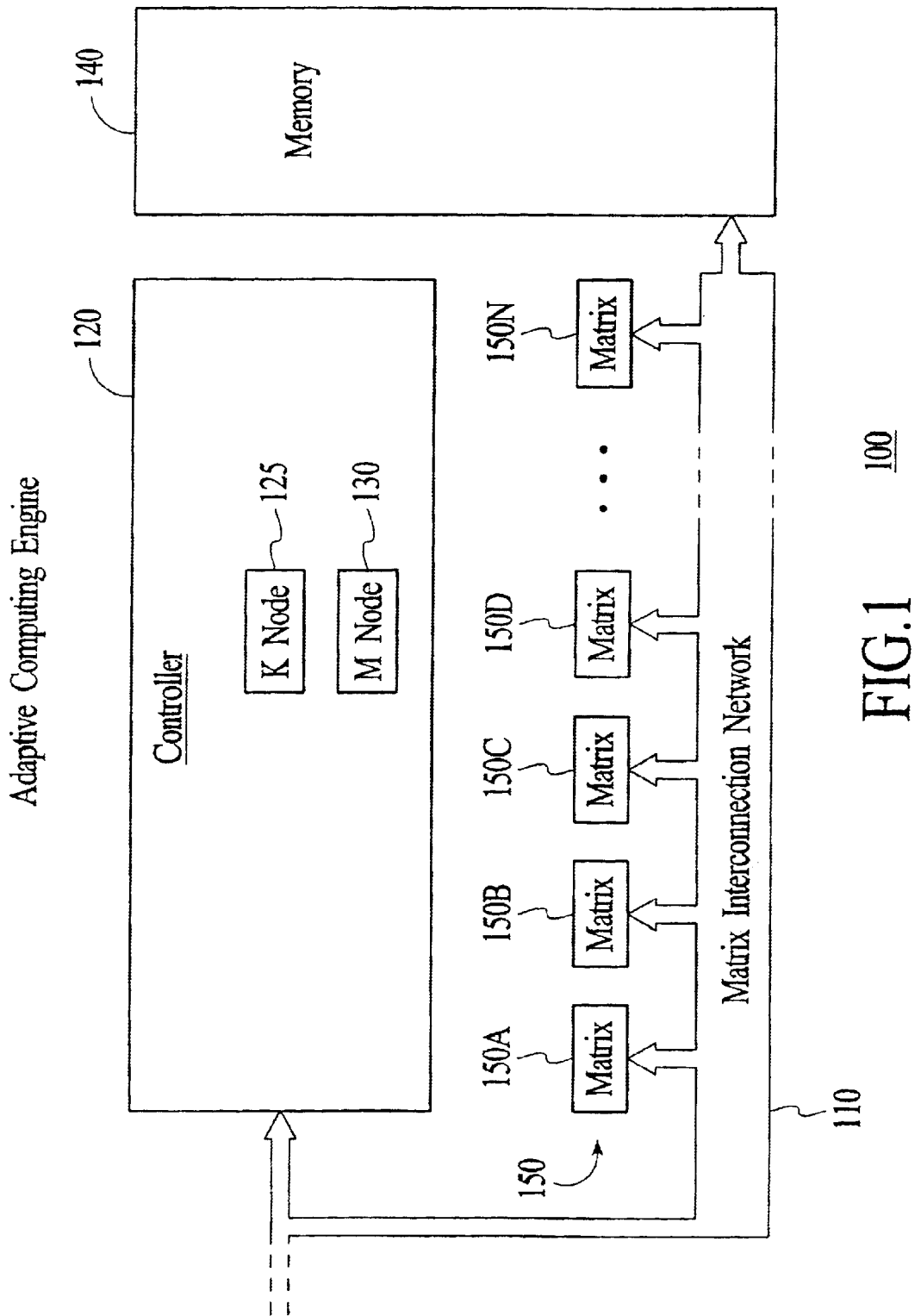
FIG. 1 is a block diagram illustrating an adaptive computing engine.

Referring to FIG. 1, a block diagram illustrates an adaptive computing engine ("ACE") 100, which is preferably embodied as an integrated circuit, or as a portion of an integrated circuit having other, additional components. In the preferred embodiment, and as discussed in greater detail below, the ACE 100 includes a controller 120, one or more reconfigurable matrices 150, such as matrices 150A through 150N as illustrated, a matrix interconnection network 110, and preferably also includes a memory 140.

The controller 120 is preferably implemented as a reduced instruction set ("RISC") processor, controller or other device or IC capable of performing the two types of functionality. The first control functionality, referred to as "kernal" control, is illustrated as kernal controller ("K Node") 125, and the second control functionality, referred to as "matrix" control, is illustrated as matrix controller ("M Node") 130.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units, which in turn generally contain a different or varied mix of fixed, application specific computational elements, which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network (MIN) 110. A more detailed discussion of the MIN is presented in co-pending U.S. patent application Ser. No. 09/898,350, entitled Method and System for an Interconnection Network to Support Communications among a Plurality of Heterogeneous Processing Elements, assigned to the assignee of the present invention, and incorporated herein by reference in its entirety.

Figure 2:
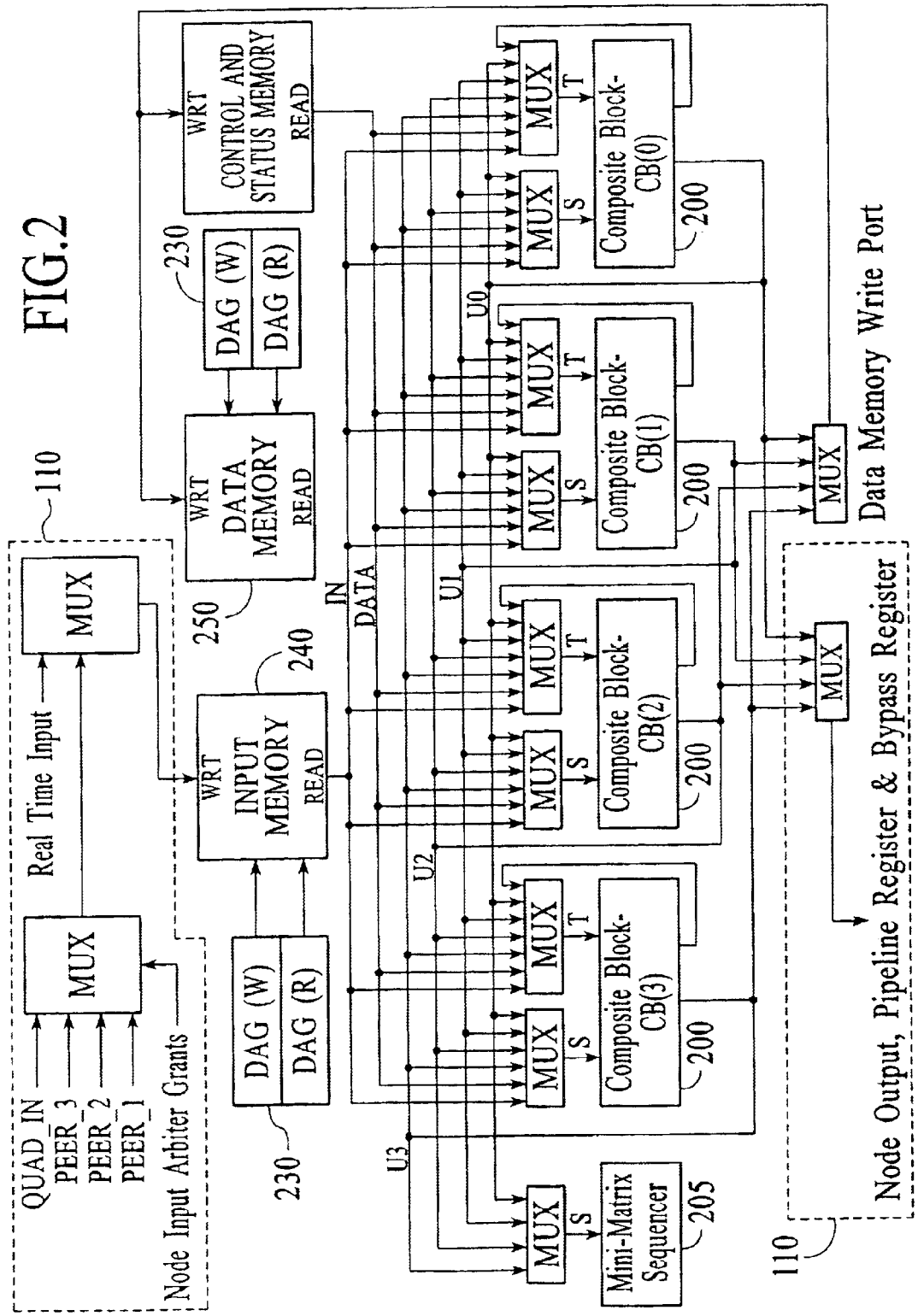
FIG. 2 illustrates a block diagram of a digital signal processing system including a mini-matrix and data network in accordance with a preferred embodiment of the present invention.
Figure 3:
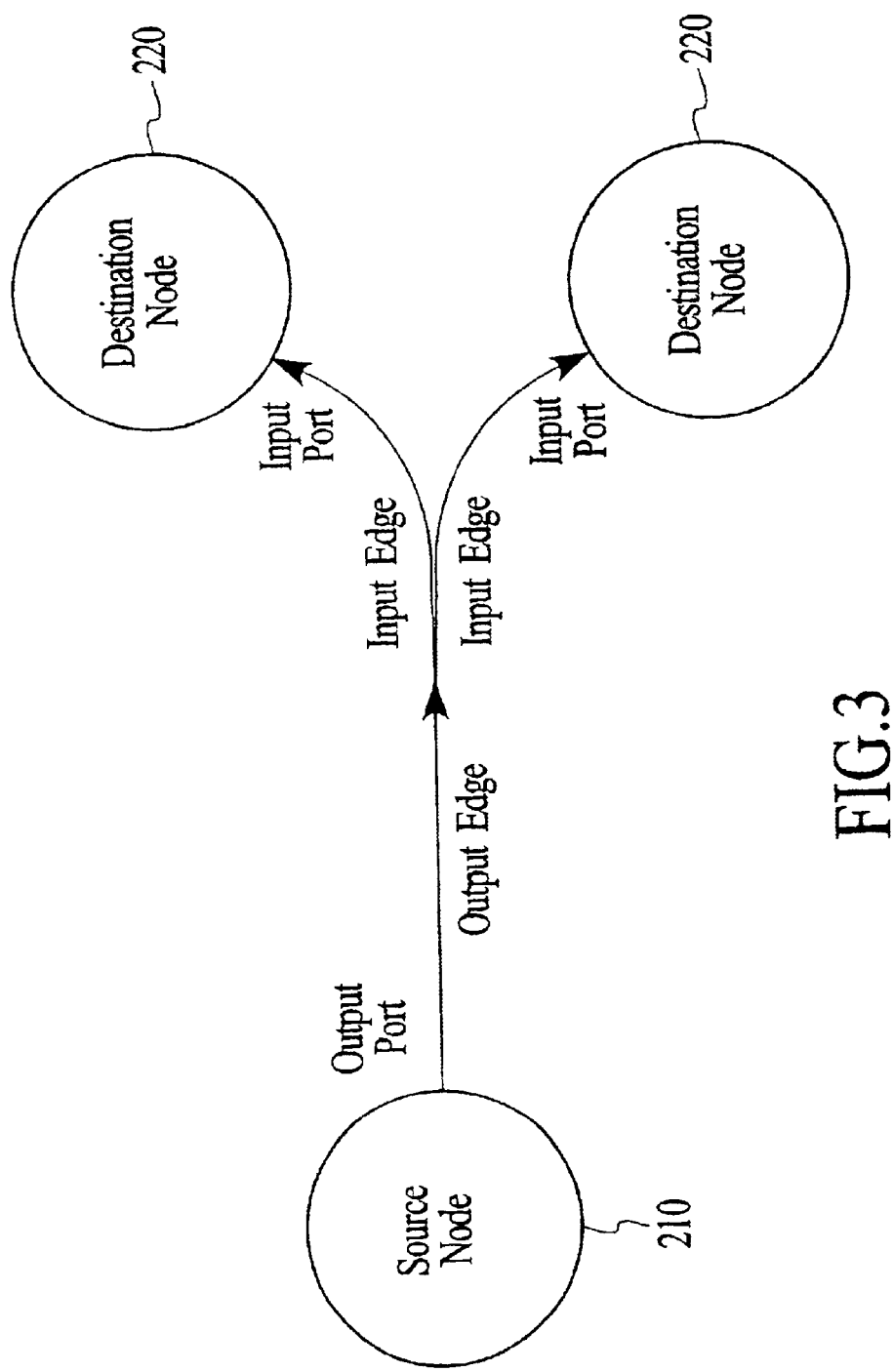
FIG. 3 illustrates a dataflow graph representation for code segment representation for the digital signal processing system of FIG. 2.

In a preferred embodiment, a particular combination of application specific computational elements in a computation unit form a mini-matrix for achieving a digital signal processing engine, as described with reference to FIG. 2. As shown, in a preferred embodiment, a mini-matrix includes four composite blocks (CBs)/computational elements 200. The four CBs 200 work in lock-step on independent instructions and share intermediate results on a data network represented by the lines among the CBs 200. A sequencer 205 provides control over the CBs 200 and includes hardware support for zero-overhead "for" loops and includes basic "if", "call", and "return" instructions not performed by the CBs 200.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units, which in turn generally contain a different or varied mix of fixed, application specific computational elements, which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network (MIN) 110. A more detailed discussion of the MIN is presented in co-pending U.S. patent application Ser. No. 09/898,350 entitled Method and System for an Interconnection Network to Support Communications among a Plurality of Heterogeneous Processing Elements, assigned to the assignee of the present invention, and incorporated herein by reference in its entirety.

Referring again to FIG. 2, further included for the mini-matrix are data address generators (DAGs) 230 for accessing memory. As is generally known in the art, a DAG is initialized to produce a sequence of addresses in the desired pattern. Once initialized, the DAG can generate an address every cycle with very little control overhead. For the min-matrix of FIG. 2, there are a total of four DAGs: two for the input memory (IM) 240 and two for the data memory (DM) 250, all of which can generate addresses in parallel. By way of example, the IM 240 has a "basic" DAG to generate write addresses and a "full featured" DAG to generate read addresses, while the DM 250 has "full featured" DAGs for both writing and reading. For purposes of this discussion, full featured DAGs refer to DAGs that can be programmed to operate independently to allow different addressing patterns, or that can be chained to allow complex addressing patterns generated by nested loops for multi-dimensional data arrays.

For the instruction set for the CBs 200, preferably a set of "atomic instructions", are provided to execute in one clock cycle with a latency of one cycle and which are divided into the general categories of arithmetic-logic instructions, multiply-accumulate instructions, flow control instructions, data memory access instructions, point-to-point (PTP) communication instructions, and control and status memory (CSM) access instructions. These instructions generally process 16-bit operands and produce 16-bit results. Suitably, the instruction set is designed to be expandable to arbitrarily high precision, such that 32, 48, 64 or higher bit precision can be handled as applications demand. Further, the nature of the atomic instructions allows these multi-precision instructions to be built with minimal overhead, as is well appreciated by those skilled in the art. In this manner, implementation of a set of software based "macro instructions" is possible, including, for example, macros that support vocoder applications compatible with ITU-T standards.

With the independent instruction processing capability of the CBs 200, the mini-matrix is capable of performing many computation, input, output and control instructions in parallel. To support these parallel modes, an instruction word in accordance with the present invention for the mini-matrix is subdivided into "instruction fields" with one field for each processing resource that can be scheduled in parallel. The following table enumerates an example of suitable designations of each of the instruction fields along with the corresponding hardware resources associated with the field:

| Instruction Field Name | Instruction Field Mnemonic | Hardware Resources |
| --- | --- | --- |
| Flow Control Instruction Field | FC | Mini-matrix Sequencer |
| Composite Block #0 Instruction Field | CB[0] | Composite Block #0 |
| Composite Block #1 Instruction Field | CB[1] | Composite Block #1 |
| Composite Block #2 Instruction Field | CB[2] | Composite Block #2 |
| Composite Block #3 Instruction Field | CB[3] | Composite Block #3 |
| Composite Block Move #0 Instruction Field | CBM[0] | Composite Block #0 Bypass Path |
| Composite Block Move #1 Instruction Field | CBM[1] | Composite Block #1 Bypass Path |
| Composite Block Move #2 Instruction Field | CBM[2] | Composite Block #2 Bypass Path |
| Composite Block Move #3 Instruction Field | CBM[3] | Composite Block #3 Bypass Path |
| Point-to-point Input Instruction Field | PI | MIN Control Hardware |
| Point-to-point Output Instruction Field | PO | Node Output, MIN Control Hardware |
| Input Memory Read Port Instruction Field | IMRP | Input Memory Read Port |
| Input Memory Read DAG Instruction Field | IMRD | Input Memory Read DAG |
| Data Memory Write Port Instruction Field | DMWP | Data Memory Write Port |

-continued

| Instruction Field Name | Instruction Field Mnemonic | Hardware Resources |
|---|---|---|
| Data Memory Write DAG Instruction Field | DMWD | Data Memory Write DAG |
| Data Memory Read Port Instruction Field | DMRP | Data Memory Read Port |
| Data Memory Read DAG Instruction Field | DMRD | Data Memory Read DAG |
| Control and Status Memory Instruction Field | CSM | Control and Status Memory |

Figure 4:
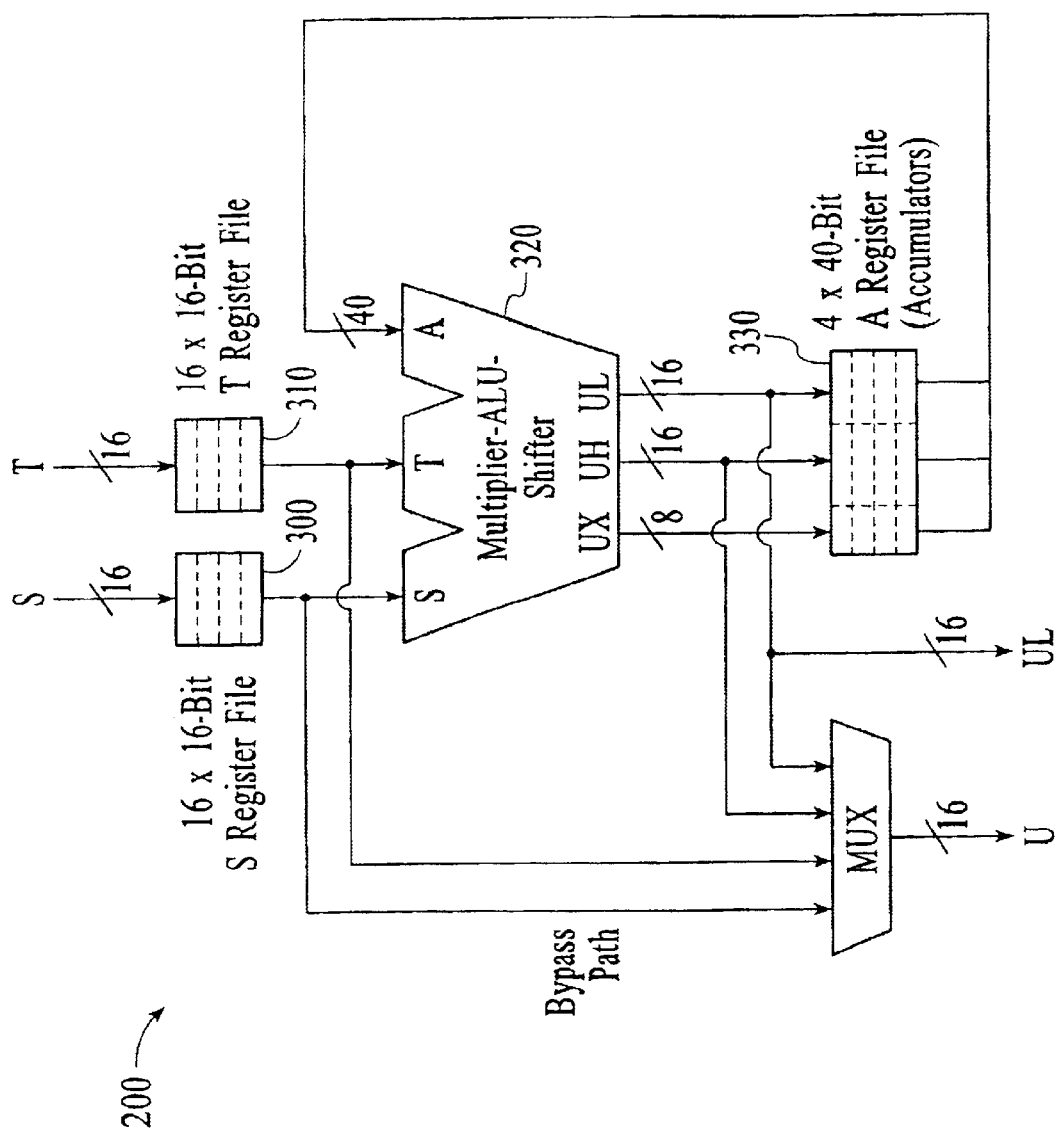
FIG. 4 illustrates a block diagram of a composite block of the mini-matrix of FIG. 2.

In a preferred embodiment, each CB 200 is capable of executing a complete set of 16-bit arithmetic, logic, multiply-accumulate and shift instructions. FIG. 4 shows a simplified block diagram of a CB 200. The CB 200 includes register files 300 and 310 coupled to a multiplier-arithmetic logic unit (ALU)-shifter element 320. The element 320 is further coupled to an accumulator (A) register file 330. As shown, there are two inputs, S and T, that come from the mini-matrix data network and two outputs, U and UL, that go to the data network. Operand data input from the data network is stored in the S and T register files 300 and 310. When an instruction is to be performed, the operand data is independently read from the S and T register files 300 and 310 and optionally from one of the accumulators, i.e., the A register file 330. The multiplier-ALU-shifter 320 performs the instruction and outputs a 40-bit result consisting of the low-order 16-bits (UL), the high-order 16-bits (UH) and 8-bits of extended precision (UX) results. The 40-bits can be stored back in the same accumulator 330 that was used as an input operand, while the low and high order parts of the result (UL and UH respectively) can be routed to the data network, as indicated. As further indicated, there is also a bypass path around the multiplier-ALU-shifter 320, so that an S or T register value can be output to the data network while an operation is being performed. Although the U output cannot be simultaneously used to output the results of the computations if the bypass is used, the bypass path does allow implementation of finite impulse response (FIR) filters where the multiplier-ALU-shifter 320 is used to perform a multiply accumulate operation (MAC) and the bypass path is used to implement a tap delay line, as is well appreciated by those skilled in the art.

Figure 5:
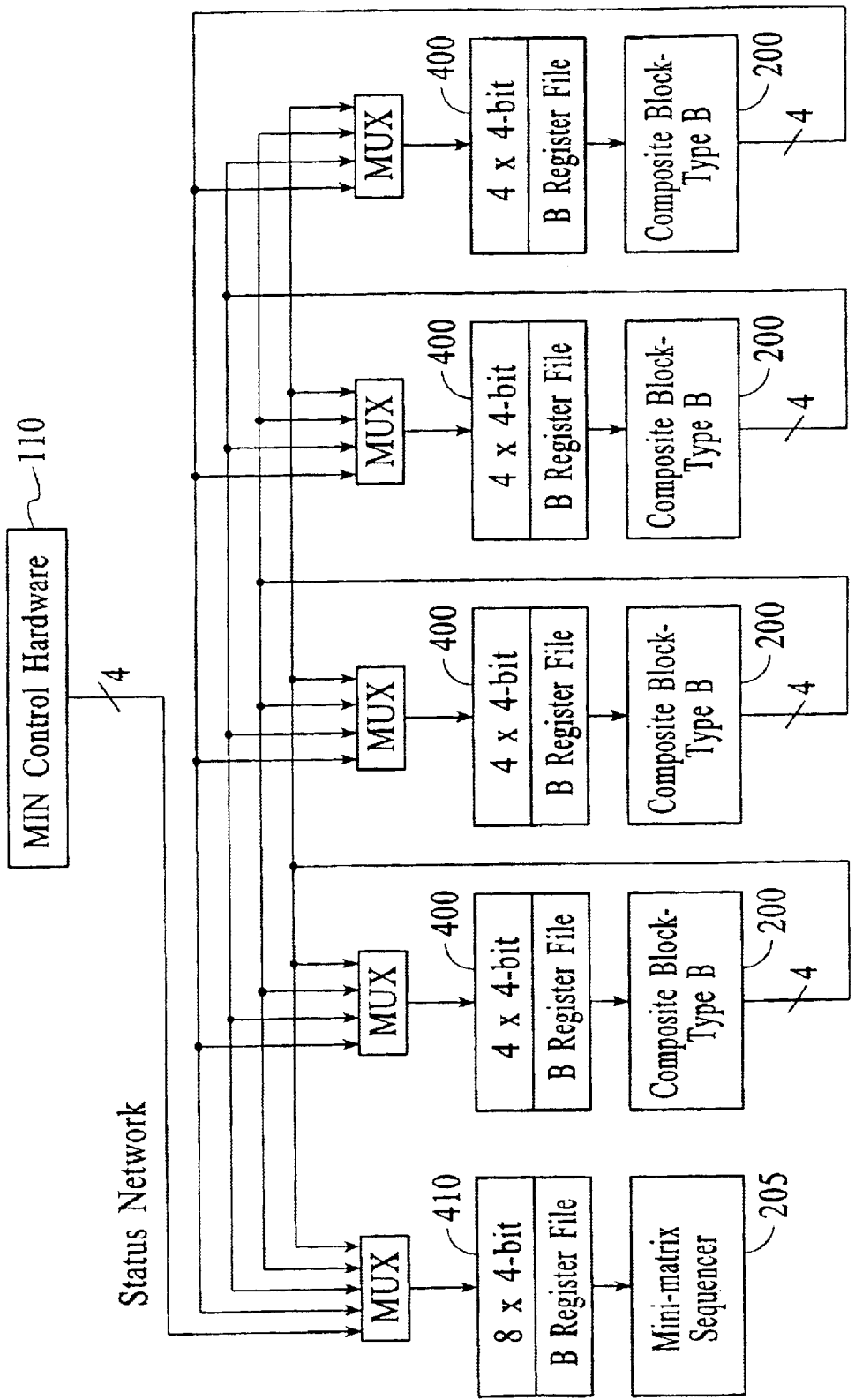
FIG. 5 illustrates a status network for the system of FIG. 1.

In addition to the numerical results output to the data network when an instruction is performed, a 4-bit status word is also output. Preferably, the status words are routed within the mini-matrix independently of the numerical results on a status network shown by the interconnection lines in FIG. 5. In order to store status word data, each CB 200 has its own status register file 400, while the mini-matrix sequencer has a status register file 410 which can be used in "if" statements for flow control. With the 4-bit status word, the following flags can be transmitted on the status network and utilized within the mini-matrix:

z—Zero flag. Normal definition: Set if the result is zero. Otherwise it is clear.

n—Negative flag. Normal definition: Set if the result is negative. Otherwise it is clear.

c—Carry/borrow flag. Normal definition: Set if there is a carry out of the most significant bit during addition or if there is a borrow out of the most significant bit during subtraction. Otherwise it is clear.

v—Overflow/underflow flag. Normal definition: Set if the computation resulted in overflow or underflow of signed operands. Otherwise it is clear.

Figure 6A:
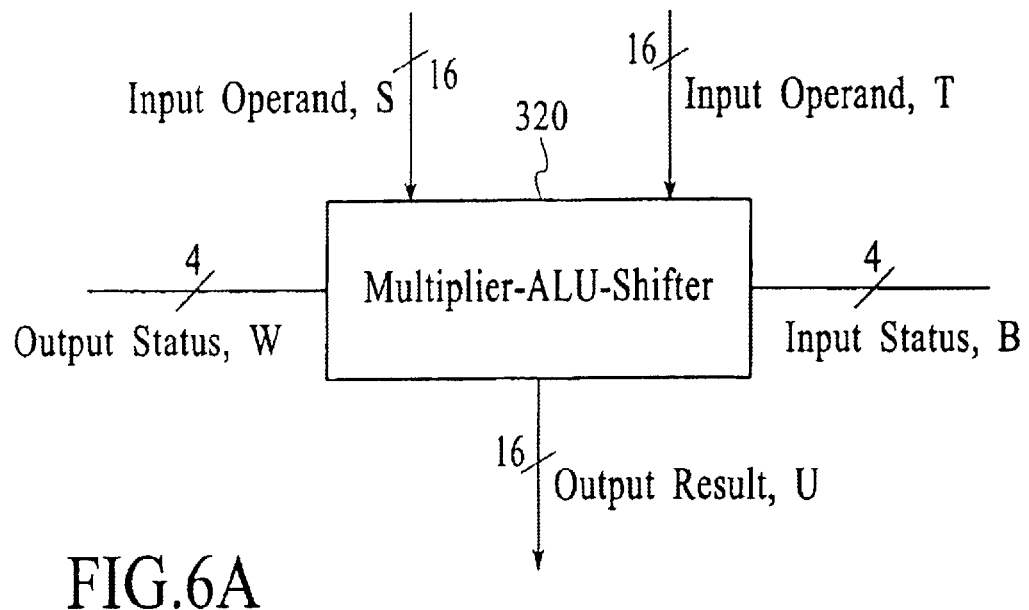
FIGS. 6a and 6b illustrate conceptual block diagrams of the inputs and outputs for instructions executed within a composite block.
Figure 6B:
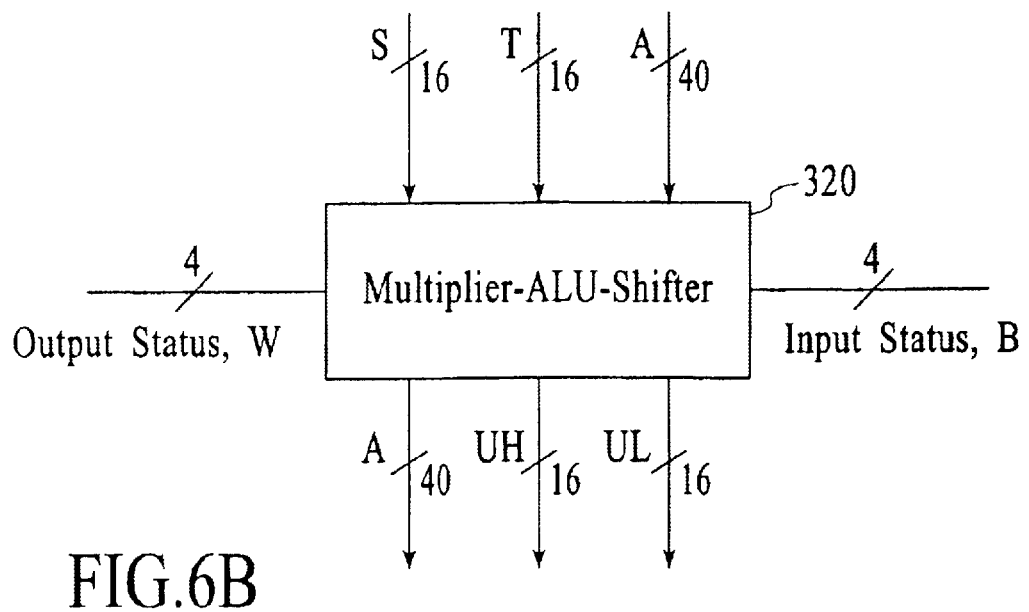

FIGS. 6a and 6b illustrate conceptual block diagrams of the inputs and outputs for arithmetic-logic instructions (FIG. 6a) and multiply-accumulate instructions (FIG. 6b) executed using the multiplier-ALU-shifter 320 that includes an indication for the status word data. For FIG. 6a, the arithmetic-logic instructions include basic 16-bit adds, subtracts, ANDs and ORs along with saturation and round instructions for two 16-bit input operands, S and T, and a 4-bit input status word, B. Outputs consist of the 16-bit output result, U, and the output status word, W, where U is output on the data network and W is output on the status network. The result U can be dropped on the floor or it can be routed to one or more destinations including the S and T register files, the output port and data memory. The status value W can also be thrown on the floor or it can be routed to one or more destinations. Although there are variations, a suitable general syntax for arithmetic-logic instructions is (U, W)=<op code> (S, T, B);

If the first result, U, is not required then it can be coded as (_,W)=<op code> (S, T, B);

If the second result, W, is not required then it can be coded as (U,_)=<op code> (S, T, B);

For FIG. 6b, the instructions include the basic 16-bit multiply and multiply-accumulate instructions, as well as a divide instruction that produces a 16-bit result in 16 cycles, and a set of shift instructions. The 40-bit accumulator includes low-order field (UL) (bits 15:0), high-order field (UH) (bits 31:16), and an extended field (UX) (bits 39:32). The extended field is used to handle overflow and underflow resulting from accumulation. Inputs include two 16-bit input operands, S and T, and a 4-bit input status word, B. Outputs include two 16-bit output results, UH and UL, and the output status word, W. S and T are input to the multiplier producing a 32-bit result.

The result UH or UL can be output onto the data network within the mini-matrix, and as with the arithmetic-logic instructions, the status, W can be output onto the status network. In addition, the result UL can be independently routed back to the T register file of the current CB 200 for output of a full 32-bit result from the CB 200. The result UH or UL can be dropped on the floor or they can be routed to one or more destinations including the S and T register files, the output port, and data memory. The status value W can also be thrown on the floor or it can be routed to one or more destinations. The full 40-bit accumulator value, A, can be stored back in the same accumulator specified as one of the input operands. For most of these instructions, an accumulator must be specified as part of the instruction. Thus, suitable general syntax for multiply-accumulate instructions is (A, UH, UL, W)=<op code> (A, S, T, B);

As with the arithmetic-logic instructions, if particular results are not required, then the instruction can be coded as:

(A,_,_,W)=<op code> (A, S, T, B);

(_,UH,_,_)=<op code> (A, S, T, B);

(_,_,UL,_)=<op code> (A, S, T, B);

With the present invention, a flexible approach to providing instruction execution in an embedded system is achieved. As described, a mini-matrix is provided as a designation of composite blocks that together achieve instruction execution for multi-bit digital signal processing in an adaptive computing engine. The ability to produce effective and efficient instruction execution via the mini-matrix is supported by innovative aspects of instruction sequencing and representation.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A system for digital signal processing within an adaptive computing engine, the system comprising:
   a mini-matrix, the mini-matrix comprising a set of composite blocks, each composite block capable of executing a predetermined set of instructions;
   a sequencer for controlling the set of composite blocks and directing instructions among the set of composite blocks based on a dataflow graph;
   a data network for transmitting data to and from the set of composite blocks and to the sequencer; and
   a status network for routing status word data resulting from instruction execution in the set of composite blocks.

2. The system of claim 1 wherein each composite block is capable of executing a set of atomic instructions.

3. The system of claim 2 wherein the set of atomic instructions further comprises a set of n-bit instructions, including arithmetic, logic, and multiply-accumulate and shift instructions.

4. The system of claim 3 wherein the set of n-bit instructions further comprises a set of 16-bit instructions.

5. The system of claim 1 wherein each composite block further comprises first and second register files coupled to a multiplier-ALU-shifter, the multiplier-ALU-shifter further coupled to an accumulator register file.

6. The system of claim 5 wherein the first and second register files store data received from the data network as operands and the multiplier-ALU-shifter performs an instruction and outputs results to the data network.

7. The system of claim 1 wherein each composite block further comprises a status register file for storing status words received from the status network.

8. The system of claim 7 wherein the status network routes status words data independently of results transmitted on the data network.

9. The system of claim 1 wherein the sequencer transmits instruction words for the mini-matrix, the instruction words subdivided into instruction fields for parallel performance of computation, input, output, and control instructions in the mini-matrix.

10. A method for digital signal processing within an adaptive computing engine, the system comprising:
    designating a set of composite blocks as a mini-matrix, each composite block capable of executing a predetermined set of instructions;
    utilizing a sequencer for controlling the set of composite blocks and directing instructions among the set of composite blocks based on a dataflow graph;
    providing a data network for transmitting data to and from the set of composite blocks and to the sequencer; and
    providing a status network for routing status word data resulting from instruction execution in the set of composite blocks.

11. The method of claim 10 wherein each composite block is capable of executing a set of atomic instructions.

12. The method of claim 11 wherein the set of atomic instructions further comprises a set of n-bit instructions, including arithmetic, logic, and multiply-accumulate and shift instructions.

13. The method of claim 12 wherein the set of n-bit instructions further comprises a set of 16-bit instructions.

14. The method of claim 10 further comprising providing first and second register files coupled to a multiplier-ALU-shifter, the multiplier-ALU-shifter further coupled to an accumulator register file in each composite block.

15. The method of claim 14 further comprising storing received data from the data network in the first and second register files as operands, performing an instruction with the multiplier-ALU-shifter, and outputting results to the data network.

16. The method of claim 10 further comprising storing status words received from the status network in a status register in the composite block.

17. The method of claim 16 further comprising routing status words on the status network independently of results data transmitted on the data network.

18. The method of claim 10 further comprising transmitting instruction words from the sequencer for the mini-matrix, the instruction words subdivided into instruction fields for parallel performance of computation, input, output, and control instructions in the mini-matrix.

19. A system for digital signal processing in an adaptive computing engine, the system comprising:
    a set of four computation blocks designated as a mini-matrix, each of the four computation blocks comprising:
      first and second register files for storing operand data;
      a multiplier-ALU-shifter coupled to the first and second register files for performing an instruction and outputting results data; and
      an accumulator register file coupled to the multiplier-ALU-shifter for storing accumulation data; and
    a sequencer for controlling the set of four composite blocks and directing instructions among the set of four composite blocks based on a dataflow graph.

20. The system of claim 19 further comprising a data network for transmitting data to and from the set of four composite blocks and to the sequencer.

21. The system of claim 20 further comprising a status network for routing status words resulting from instruction execution in the set of four composite blocks.

22. The system of claim 19 wherein each composite block is capable of executing a set of 16-bit atomic instructions, including arithmetic, logic, and multiply-accumulate and shift instructions.

23. The system of claim 21 wherein the status network routes status words independently of results data transmitted on the data network.

24. The system of claim 20 wherein the sequencer transmits instruction words for the mini-matrix, the instruction word data subdivided into instruction fields for parallel performance of computation, input, output, and control instructions in the mini-matrix.

* * * * *